US007350847B2

(12) United States Patent
Svensson

(10) Patent No.: US 7,350,847 B2
(45) Date of Patent: Apr. 1, 2008

(54) SIDE DOOR FOR MOTOR VEHICLE

(75) Inventor: Bengt Svensson, Trollhättan (SE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/600,232

(22) Filed: Nov. 16, 2006

(65) Prior Publication Data

US 2007/0136987 A1 Jun. 21, 2007

(30) Foreign Application Priority Data

Nov. 17, 2005 (SE) .................................... 0502531

(51) Int. Cl.
*B60J 5/00* (2006.01)

(52) U.S. Cl. .................................... 296/146.11; 16/386

(58) Field of Classification Search ........... 296/146.11, 296/202; 16/382, 232, 314, 389, 249, 291; 52/211; 49/504, 382, 193, 386, 501; 312/263, 312/257.1
See application file for complete search history.

(56) References Cited

U.S. PATENT DOCUMENTS 3,828,476 A * 8/1974 Tenenbaum et al. .......... 49/501
3,870,361 A * 3/1975 Krause .................. 296/146.11
4,765,025 A * 8/1988 Salazar ........................ 16/261
5,408,785 A * 4/1995 Heim et al. ............ 296/146.11
5,575,037 A * 11/1996 Tolle et al. ................... 16/334
5,577,295 A * 11/1996 Papke et al. .................. 16/386

(Continued)

FOREIGN PATENT DOCUMENTS

DE 4034599 2/1992

(Continued)

OTHER PUBLICATIONS

European Search Report dated Apr. 3, 2007.

*Primary Examiner*—Kiran B. Patel
(74) *Attorney, Agent, or Firm*—Harness, Dickey & Pierce, P.L.C.

(57) ABSTRACT

Example embodiments relate to a side door for a motor vehicle, comprising at least one hinge device for pivotal connection of the side door to one of the body posts of the motor vehicle, the hinge device including a first hinge half adapted to be fastened to one of the body posts of the motor vehicle, a second hinge half which by means of a joint is fastened to a first side of the side door, a hinge pin which pivotally connects the first hinge half to the second hinge half in such a manner that the side door is pivotable about a vertical axis, defined by the hinge pin, between an open and a closed position, the joint including at least one threaded bolt which extends horizontally, from the first side of the side door, through a through hole in the second hinge half and through a through hole in the side door, and projects from a second side of the side door, a threaded nut element arranged around the through hole on the second side of the side door and in threaded engagement with the threaded bolt. The side door is characterised in that the nut element extends through the through hole in the side door and projects a small distance from the first side of the side door into the through hole in the second hinge half.

3 Claims, 2 Drawing Sheets

U.S. PATENT DOCUMENTS

| | | | | |
|---|---|---|---|---|
| 5,791,018 | A * | 8/1998 | Yoshinobu | 16/387 |
| 6,336,675 | B1 * | 1/2002 | Bruckner | 296/146.11 |
| 6,591,451 | B2 * | 7/2003 | Gruber et al. | 16/262 |
| 6,718,596 | B2 * | 4/2004 | Kohlstrand et al. | 296/146.11 |
| 6,976,290 | B2 * | 12/2005 | Boyer et al. | 16/280 |
| 7,003,859 | B2 * | 2/2006 | Lehner | 29/402.03 |
| 2003/0182761 | A1 * | 10/2003 | Kidd | 16/386 |

FOREIGN PATENT DOCUMENTS

| | | |
|---|---|---|
| DE | 4032930 | 4/1992 |
| DE | 4221795 | 1/1994 |
| DE | 19818265 | 10/1999 |
| EP | 0435490 | 7/1991 |
| EP | 0708014 | 4/1996 |

* cited by examiner

SIDE DOOR FOR MOTOR VEHICLE

PRIORITY STATEMENT

This application claims the benefit of Swedish Patent Application No. 0502531-7, filed Nov. 17, 2005, in the Swedish Patent Office, the disclosure of which is incorporated herein in its entirety by reference.

FIELD

Example embodiments relate to a side door according to the preamble to claim 1.

BACKGROUND

In a car production plant, the painting of the car body, side doors, etc., is part of the production process. After painting, the side doors are usually disassembled so that it will be easier at a different place to provide them with various equipment, such as panels, cables, loudspeakers, etc. After that, they are reassembled on the car body. There is, however, a risk of paint damage when disassembling and reassembling the side door, in case parts of the hinge halves mounted on the car body touch the newly painted side door.

SUMMARY

Example embodiments reduce the risk of paint damage when disassembling/reassembling the side door after painting.

Example embodiments facilitate the final assembly of the side door after providing it with panels, loudspeakers, etc.

Example embodiments are directed to a side door, as defined by way of introduction and having the features stated in the characterising part of claim 1.

Since the nut element extends through the through hole in the side door and projects a small distance from the first side of the side door into the through hole in the second hinge half, several advantages are obtained.

To disassemble the side door it is necessary, after having removed the bolt from the joint, first to move the side door in the horizontal direction so that the projecting part of the nut element is disengaged from the through hole in the second hinge half. This is important if the side door has to be moved substantially vertically in the next step, for instance, if another one of the hinge devices of the side door only admits a substantially vertical lifting motion of the side door. In such a situation, the projecting part of the nut element will function as a spacer between the side door and the second hinge half, thus preventing the first side of the side door from being subject to paint damage. Similarly, the projecting part of the nut element will have the same effect when the side door is reassembled on the post of the car body, after the side door has been provided with various equipment. It is true that the projecting part of the nut element will slide against the second hinge half and may damage its surface. This is of no importance, however, since this surface will not be exposed when the side door has been reassembled on the body post. In any case, the projecting part of the nut element will function as a guide when the side door is reassembled on the body post since it facilitates the locating of the hole through which the projecting part of the nut element is to be inserted.

Suitably, the nut element projects a small distance of 2-4 mm from the first side of the side door, preferably 3 mm. As a result, a sufficient distance is created between the side door and the second hinge half to ensure that no paint damage will occur on the side door.

BRIEF DESCRIPTION OF THE DRAWINGS

Example embodiments will now be described with reference to the accompanying drawings, in which.

DETAILED DESCRIPTION OF EXAMPLE EMBODIMENTS

FIG. 1 is a vertical section of a side door 1 intended for a motor vehicle (not shown), comprising an upper and a lower hinge device 3, 5. They are adapted to allow opening and closing of the side door.

Figure 3A:
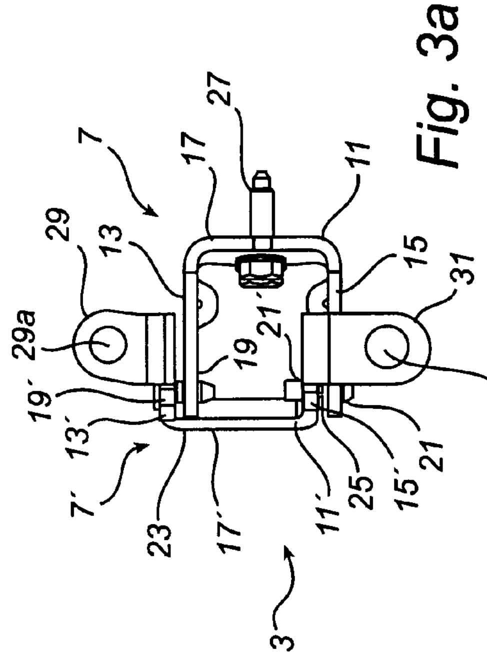
FIG. 3*a* shows an example of the upper hinge device in FIG. 1*a*.

With reference to FIG. 3*a*, the upper hinge device 3 comprises a first and a second hinge half 7, 7', the first and the second hinge half 7, 7' both comprising a U-shaped element 11, 11'. Each U-shaped element 11, 11' comprises two legs 13, 15 and 13', 15', respectively, and a web 17, 17', which interconnects the two legs 13, 15 and 13', 15', respectively. In each leg 13, 15, 13', 15', a through hole 19, 21, 19', 21' is formed, and the two hinge halves 7, 7' are mutually arranged such that the through holes 19', 21' of the second hinge half 7' are positioned exactly above the respective through holes 19, 21 of the first hinge half 7. An upper and a lower pin 23, 25 extend vertically through the through holes 19, 19' and 21, 21', respectively, and interconnect the two hinge halves 7, 7'in such a manner that they can be pivoted relative to each other about a vertical axis extending through the two pins 23, 25.

In its web 17, the first hinge half 7 is provided with a through bolt 27 which is adapted to firmly fasten the first hinge half 7 to one of the body posts of the motor vehicle. The second hinge half 7' comprises two ears 29, 31, which each protrudes from a leg end at substantially right angles. Each ear is formed with a through hole 29*a*, 31*a* intended for bolts (not shown) to fasten the ears 29, 31 to the side door 1.

The upper hinge device 3 is a lift-off hinge, which means that the second hinge half 7' can be lifted off from the first hinge half 7 as soon as the lower pin 25 has been removed (the upper pin 23 is not fastened to the leg 13 of the first hinge half 7; it only rests in the same). With this design, the first hinge half 7 will remain in the body post when the door is in a disassembled state, whereas the second hinge half 7' will remain in the side door 1.

Figure 3B:
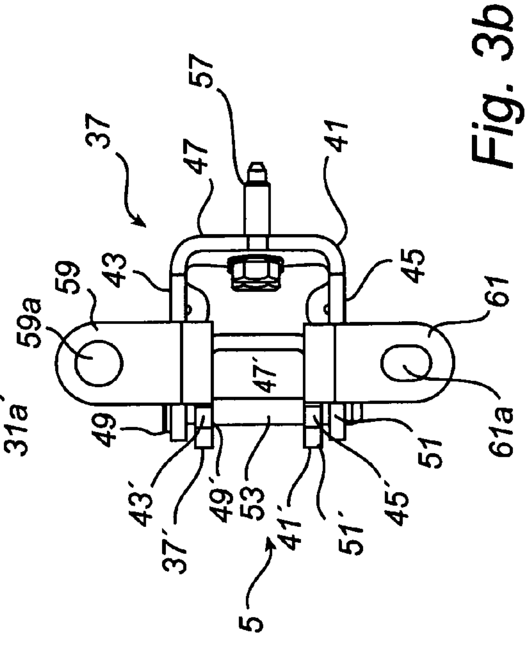
FIG. 3*b* shows an example of the lower hinge device in FIG. 1*a*.

With reference to FIG. 3*b*, the lower hinge device 5 comprises a first and a second hinge half 37, 37', the first and the second hinge half 37, 37' both comprising a U-shaped element 41, 41'. Each U-shaped element 41, 41' comprises two legs 43, 45 and 43', 45', respectively, and a web 47, 47', which interconnects the two legs 43, 45 and 43', 45', respectively. In each leg, a through hole 49, 51, 49', 51' is formed, and the two hinge halves 37, 37' are mutually arranged such that the through hole 49' of the first hinge half 37 is positioned above the through hole 49' of the second hinge half 37', whereas the through hole 51 of the first hinge half 37 is positioned under the through hole 51' of the second hinge half 37'. One single vertically elongated pin 53 extends through the through holes 49, 51, 49', 51' and interconnects the two hinge halves 37, 37' in such a manner that they can be pivoted relative to each other about a vertical axis extending along the pin 53.

In its web 47, the first hinge half 37 is provided with a through bolt 57 which is adapted to firmly fasten the first hinge half 37 to the same body post as the first hinge half 7 of the upper hinge device 3. The second hinge half 37' comprises two ears 59, 61, which each protrudes from a leg end at substantially right angles. Each ear 59, 61 is formed with a through hole 59*a*, 61*a* intended for bolts (not shown) to fasten the ears 59, 61 to the side door 1.

The lower hinge device 5 is a bolt-off hinge, which means that the bolts that fasten the second hinge half 37' to the side door 1 have to be removed before the side door 1 can be disassembled from the body. This is because the hinge halves 37, 37' cannot be separated as in the upper hinge device 3. With this design, both the first and the second hinge half 37, 37' will remain in the body post when the side door is in a disassembled state.

Figure 1B:
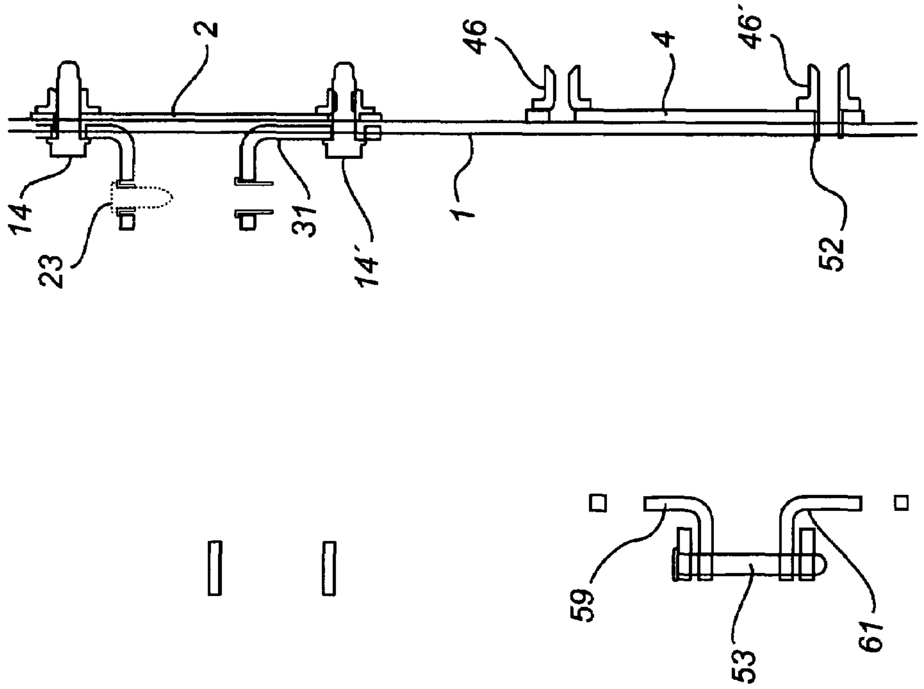
FIG. 1*b* is an example vertical section of the side door in FIG. 1*a*, in a disassembled state.
Figure 1A:
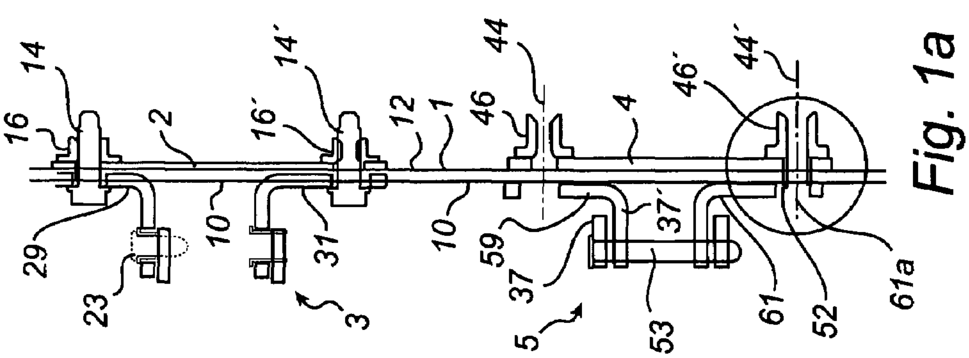
FIG. 1*a* is a vertical section of a schematic side door mounted on the body of a motor vehicle by means of an upper and a lower hinge device according to example embodiments.

With reference to FIG. 1*a*, the side door 1 comprises an upper and a lower fastening plate 2, 4 arranged on a level with the upper and the lower hinge device 3, 5, respectively.

In the upper hinge device 3, each ear 29, 31 of the second hinge half 7' abuts against a first side 10 of the side door 1. A threaded fastening bolt 14, 14' extends through the through hole 29*a*, 31*a* of each ear 29, 31, through a through hole in the side door 1 and through a through hole in the upper fastening plate 2. Threaded nut elements 16, 16' are arranged in threaded engagement with respective fastening bolts 14, 14', which project from the upper fastening plate 2 on a second side 12 of the side door 1. This results in a joint that firmly connects the side door 1 and the upper hinge device 3.

In the lower hinge device 5, each ear 59, 61 of the second hinge half 37' abuts against the first side 10 of the side door 1. Fastening bolts 14, 14' (schematically indicated by their centre lines) extend through the through hole 59*a*, 61*a* of each ear 59, 61, through a through hole 6 in the side door 1 and through a through hole 6 in the lower fastening plate 4. Threaded nut elements 46, 46' are arranged in threaded engagement with associated fastening bolts 44, 44', which project from the lower fastening plate 4. This results in a joint that firmly connects the side door 1 and the lower hinge device 3.

As mentioned by way of introduction, the side door 1 has to be disassembled after the painting is completed to be equipped with, for instance, panels, loudspeakers, window lifters, etc. To this end, the lower pin 25 of the upper hinge device 3 has to be removed (which is already done in FIG. 1*a*), as well as the two fastening bolts of the lower hinge device 5.

Figure 2:
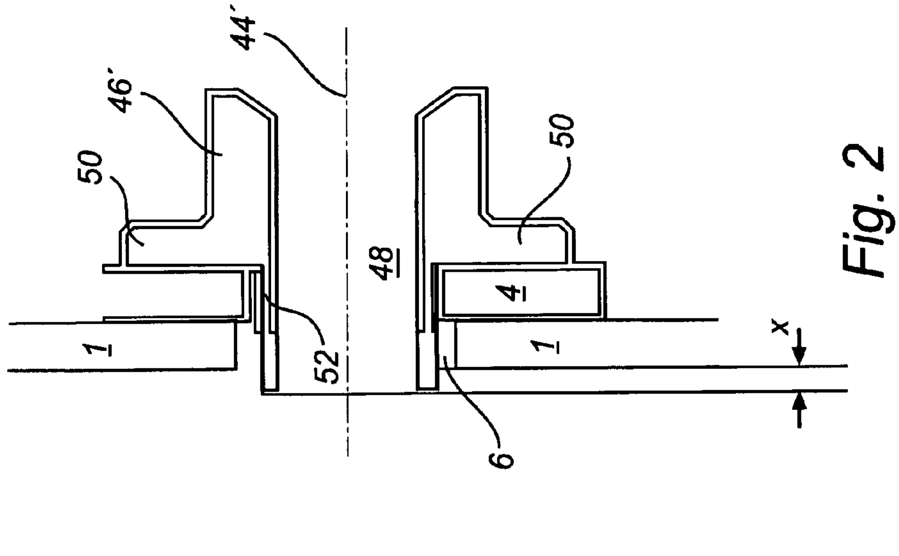
FIG. 2 is an example enlargement of the encircled area in FIG. 1*a*.

As seen in FIG. 2, which shows the encircled area in FIG. 1*a*, the nut element 46' is substantially cylindrical and provided with a threaded through hole 48. The nut element 46' also comprises a flange 50 which abuts against and is welded to the lower fastening plate 4 on the second side 12 of the side door 1. The nut element 46' is positioned around the through hole 6 extending through the fastening plate 4 and the side door 1. The nut element 46' also comprises a neck section 52 extending through the through hole 6 in the fastening plate 4 and in the side door 1 and further into the through hole 61*a* of the ear 61 a distance x. This distance x is 2-4 mm and preferably 3 mm.

In order to move the side door 1 to the position shown in FIG. 1*b*, which is intended to schematically represent a position in which the side door 1 can be provided with various equipment, the side door 1 first has to be moved to the right (seen in FIG. 1*a*) at least the distance x by which the neck section 52 of the nut element 46' extends into the through hole 61*a* of the ear 61*a*. This is possible since there is some radial play between the pins 23, 25, 53 and the respective through holes 19, 19', 21, 21', 49, 49', 51, 51' in the legs of the hinge halves. Subsequently, the side door 1 can be lifted upwards (seen in FIG. 1*a*) until the upper pin 23 of the upper hinge device 3 is disengaged from the through hole 19, 19', after about 20 mm. The side door 1 is then completely disengaged from the hinge halves 7, 7', 47' fastened to the side posts, the side door 1 being movable to the position in which the side door 1 can be provided with the necessary equipment. The projecting neck section 52 of the nut element 46' will function as a spacer between the side door 1 and the ears 29, 31 and 59, 61, respectively, during the upward movement of the side door 1, and the ears 29, 31, 59, 61 will not damage the newly painted surface of the side door 1. Instead, the projecting neck section 52 will slide along the ears 59, 61 and ensure at least a distance x between the ears 59, 61 and the side door 1.

It is only necessary for the lower nut element 46' to be provided with a projecting neck section, since the side door only needs to be lifted a short distance before the pin 23 is disengaged from the through hole 19 in the leg 13, even if it is possible also for the upper nut element 46 of the lower hinge device 5 to be provided with such a neck section.

When equipped as desired, the side door 1 can be reassembled on the body post. An assembling process inversely to the disassembling process is then carried out. When assembling, the projecting neck section 52 will once again function as a spacer and protect the paint of the side door 1. In addition, the projecting neck section 52 will function as a guiding element for easy locating of the through hole 61*a* in the ear 61. It is thus ensured that the side door 1 is correctly positioned, since the projecting neck section 52 will slide along the surface of the ear 61 and enter the through hole 61*a* when reached.

Although the shown side door 1 is provided with an upper hinge device of lift-off type and a lower hinge device of bolt-off type, an opposite arrangement is also possible, i.e. an upper hinge device of bolt-off type and a lower hinge device of lift-off type.

The invention claimed is:

1. A side door of a motor vehicle, comprising at least one hinge device for pivotal connection of the side door to one of the body posts of the motor vehicle, the hinge device including:

a first hinge half adapted to be fastened to one of the body posts of the motor vehicle, a second hinge half which by means of a joint is adapted to be fastened to a first side of the side door, a hinge pin which pivotally connects the first hinge half to the second hinge half in such a manner that the side door is pivotable about a vertical axis, defined by the hinge pin, between an open and a closed position, the joint including:

at least one threaded bolt which extends horizontally, from the first side of the side door, through a through hole in the second hinge half and through a through hole in the side door, and projects from a second side of the side door, a threaded nut element arranged around the through hole on the second side of the side door and in threaded engagement with the threaded bolt, wherein the nut element extends through the through hole in the side door and projects a small distance from the first side of the side door into the through hole in the second hinge half.

2. A side door as claimed in claim 1, wherein the nut element projects a distance (x) of 2-4 mm from the first side of the side door.

3. A side door as claimed in claim 1, wherein the nut element projects a distance (x) of 3 mm from the first side of the side door.

* * * * *